(12) United States Patent
Watanabe

(10) Patent No.: US 9,964,641 B2
(45) Date of Patent: May 8, 2018

(54) OBJECT DETECTION DEVICE

(71) Applicant: HONDA MOTOR CO., LTD., Minato-Ku, Tokyo (JP)

(72) Inventor: Takato Watanabe, Sakura-Shi (JP)

(73) Assignee: Honda Motor Co., Ltd., Tokyo (JP)

( * ) Notice: Subject to any disclaimer, the term of this patent is extended or adjusted under 35 U.S.C. 154(b) by 419 days.

(21) Appl. No.: 14/945,805

(22) Filed: Nov. 19, 2015

(65) Prior Publication Data
US 2016/0192518 A1 Jun. 30, 2016

(30) Foreign Application Priority Data

Dec. 25, 2014 (JP) ................................. 2014-261523

(51) Int. Cl.
| | |
|---|---|
| H05K 5/02 | (2006.01) |
| G01S 13/93 | (2006.01) |
| G01S 7/02 | (2006.01) |
| G08G 1/16 | (2006.01) |

(52) U.S. Cl.
CPC ............. *G01S 13/931* (2013.01); *G01S 7/02* (2013.01); *G01S 2007/027* (2013.01); *G01S 2013/9371* (2013.01); *G01S 2013/9385* (2013.01); *G08G 1/166* (2013.01); *G08G 1/167* (2013.01)

(58) Field of Classification Search
CPC ............. G01S 13/931; G01S 2007/027; G01S 2013/9371; G01S 2013/9385; G01S 7/02; G08G 1/166; G08G 1/167
USPC ............................................ 342/69; 361/807
See application file for complete search history.

(56) References Cited

U.S. PATENT DOCUMENTS

2009/0066593 A1* 3/2009 Jared .................... H01Q 1/1214
343/713

FOREIGN PATENT DOCUMENTS

| CN | 101425228 A | 5/2009 |
|---|---|---|
| CN | 102405421 A | 4/2012 |
| CN | 102555953 A | 7/2012 |
| JP | S57-070172 U | 4/1982 |
| JP | H10-123248 A | 5/1998 |
| JP | 2002-357653 A | 12/2002 |
| JP | 2007-106199 A | 4/2007 |

(Continued)

OTHER PUBLICATIONS

Office Action issued in the corresponding Chinese Patent Application No. 201510831618.7 dated Aug. 18, 2017, and a partial English translation thereof.

(Continued)

*Primary Examiner* — Timothy A Brainard
(74) *Attorney, Agent, or Firm* — Carrier Blackman & Associates, P.C.; Joseph P. Carrier; William D. Blackman

(57) ABSTRACT

An object detection device includes: an object detection portion which detects an object around a vehicle; a support member by which the object detection portion is attached to the vehicle; and a cover member which is provided in at least one of the object detection portion and the support member and extends from the object detection portion side toward the outside of the vehicle, wherein the cover member includes a cover main body portion, a receiving portion which receives a load applied from the outside of the vehicle, and a first fragile portion which is provided between the cover main body portion and the receiving portion, wherein the support member includes a second fragile portion.

3 Claims, 8 Drawing Sheets

(56) References Cited

FOREIGN PATENT DOCUMENTS

JP    2009-300390 A    12/2009

OTHER PUBLICATIONS

Office Action issued in the corresponding Japanese Patent Application No. 2014-261523 dated Feb. 28, 2017, and the English translation thereof.
Office Action, Notice of Allowance, issued in the corresponding Japanese Patent Application 2014-261523, dated Jan. 9, 2018, and the English translation thereof.

* cited by examiner

OBJECT DETECTION DEVICE

CROSS REFERENCE TO RELATED APPLICATIONS

Priority is claimed on Japanese Patent Application No. 2014-261523, filed on Dec. 25, 2014, the content of which is incorporated herein by reference.

BACKGROUND OF THE INVENTION

1. Field of the Invention

The present invention relates to an object detection device.

2. Description of Related Art

As an object detection device which recognizes the presence of an object such as a vehicle around a host vehicle, for example, at a blind spot obliquely rearward with respect to a traveling direction of the host vehicle, there is an object detection device which determines the presence of the object by using detection results of a radar device and notifies the driver of the determination results.

For example, Japanese Unexamined Patent Application, First Publication No. 2002-357653 discloses an object detection device in which a radar device (object detection portion) which is a sensing device is attached to a bracket of a vehicle body via a displacement permission unit so as to be displaced in a direction opposite to a vehicle traveling direction by a load from the vehicle traveling direction.

In addition, Japanese Unexamined Patent Application, First Publication No. 2009-300390 discloses an object detection device in which a cover member which covers an upper region of an electromagnetic wave transmitting cover provided on a front surface of an antenna for sending and receiving millimeter waves is disposed to prevent a decrease in performance of a millimeter wave radar device (object detection portion) during rainfall or the like.

SUMMARY OF THE INVENTION

However, in the related art disclosed in Japanese Unexamined Patent Application, First Publication No. 2002-357653, the position of the radar device is deviated by even a load generated when a vehicle is subjected to a slight collision (hereinafter, referred to as a minor collision) at a low speed such as several kilometers per hour, and there is a concern that accuracy of the object detection device may decrease. In addition, in the related art disclosed in Japanese Unexamined Patent Application, First Publication No. 2009-300390, when a load is applied to the object detection device from the outside, the cover member covering the object detection device moves, and there is a concern that the cover member may come into contact with the object detection device, a peripheral component such as a wire harness, or the like.

An aspect of the present invention is made in consideration of the above-described circumstances, and an object thereof is to provide an object detection device capable of preventing an object detection portion from being deviated and preventing a peripheral component and the object detection portion from being damaged when a load less than a predetermined value is applied, and preventing the object detection portion from being damaged when a load equal to or more than a predetermined value is applied.

In order to solve the above-described problems and achieve the object, the present invention adopts the following aspects.

(1) According to an aspect of the present invention, there is provided an object detection device, including: an object detection portion which detects an object around a vehicle; a support member by which the object detection portion is attached to the vehicle; and a cover member which is provided in at least one of the object detection portion and the support member and extends from the object detection portion side toward the outside of the vehicle, in which the cover member includes a cover main body portion, a receiving portion which receives a load applied from the outside of the vehicle, and a first fragile portion which is provided between the cover main body portion and the receiving portion, the support member includes a second fragile portion, the first fragile portion of the cover member is formed to be damaged when a load equal to or more than a first predetermined value and less than a second predetermined value is applied to the receiving portion along a predetermined direction, and the second fragile portion of the support member is formed to be damaged when a load equal to or more than the second predetermined value is applied to the cover main body portion along the predetermined direction.

According to the aspect of (1), since the first fragile portion is formed to be damaged when a load equal to or more than the first predetermined value and less than the second predetermined value is applied to the receiving portion along the predetermined direction, the load is absorbed by the first fragile portion, and it is possible to prevent the load from being transmitted to the object detection portion. Accordingly, when the load equal to or more the first predetermined value and less than the second predetermined value is applied, it is possible to prevent the object detection portion from being deviated, and it is possible to prevent peripheral components and the object detection portion from being damaged. In addition, since the second fragile portion is formed to be damaged when a load equal to or more than the second predetermined value is applied to the cover main body portion along the predetermined direction, the load is absorbed by the second fragile portion, and it is possible to prevent the load from being transmitted to the object detection portion. Accordingly, it is possible to prevent the object detection portion from being damaged when the load equal to or more than the second predetermined value is applied.

(2) In the object detection device according to the aspect of (1), the support member may include a support pedestal portion to which the object detection portion is attached, and a plurality of leg portions which stand up from the support pedestal portion and are connected to the vehicle, the plurality of leg portions may include a receiving leg portion which is provided at a position corresponding to the receiving portion, and the receiving leg portion may include the second fragile portion.

In the case of (2), since the plurality of leg portions includes the receiving leg portion which is provided at the position corresponding to the receiving portion, and the receiving leg portion includes the second fragile portion, when the load equal to or more than the second predetermined value is applied to the cover main body portion along the predetermined direction, the second fragile portion of the receiving leg portion is damaged, and the leg portions other than the receiving leg portion and the support pedestal portion to which the object detection portion is attached are connected to each other. Accordingly, the load is absorbed by the second fragile portion, it is possible to prevent the load from being transmitted to the object detection portion, and it is possible to prevent the object detection portion from greatly moving. Particularly, when two leg portions are provided and one out of the two leg portions is the receiving leg portion, it is possible to move the support pedestal portion so as to be rotated with a boundary line between the leg portions other than the receiving leg portion and the support pedestal portion as a rotation center. Accordingly, it is possible to prevent the object detection portion from greatly moving to absorb the load, and it is possible to prevent the object detection portion from being damaged.

(3) In the object detection device according to the aspect of (2), the object detection portion may include a signal extraction portion to which a signal wire is capable of being connected at a position corresponding to the receiving leg portion, and an opening portion may be formed at a position corresponding to the signal extraction portion in the second fragile portion.

In the case of (3), since the opening portion is formed at the position corresponding to the signal extraction portion in the second fragile portion, when the load equal to or more than the second predetermined value is applied to the cover main body portion and the second fragile portion is damaged, the signal extract portion can enter the opening portion. Accordingly, since it is possible to prevent the signal extraction portion and the signal wire from being bit by the receiving leg portion and the support pedestal portion, it is possible to prevent the object detection portion and the signal wire from being damaged.

According to the aspects of the present invention, since the first fragile portion is formed so as to be damaged when the load equal to or more than the first predetermined value and less than the second predetermined value is applied to the receiving portion along the predetermined direction, the load is absorbed by the first fragile portion, and it is possible to prevent the load from being transmitted to the object detection portion. Accordingly, when the load equal to or more than the first predetermined value and less than the second predetermined value is applied, it is possible to prevent the object detection portion from being deviated, and it is possible to prevent peripheral components and the object detection portion from being damaged. In addition, since the second fragile portion is formed so as to be damaged when the load equal to or more than the second predetermined value is applied to the cover main body portion along a predetermined direction, the load is absorbed by the second fragile portion, and it is possible to prevent the load from being transmitted to the object detection portion. Accordingly, it is possible to prevent the object detection portion from being damaged when the load equal to or more than the second predetermined value is applied.

DETAILED DESCRIPTION OF THE INVENTION

Hereinafter, an object detection device according to an embodiment of the present invention will be described with reference to the drawings.

Figure 1:
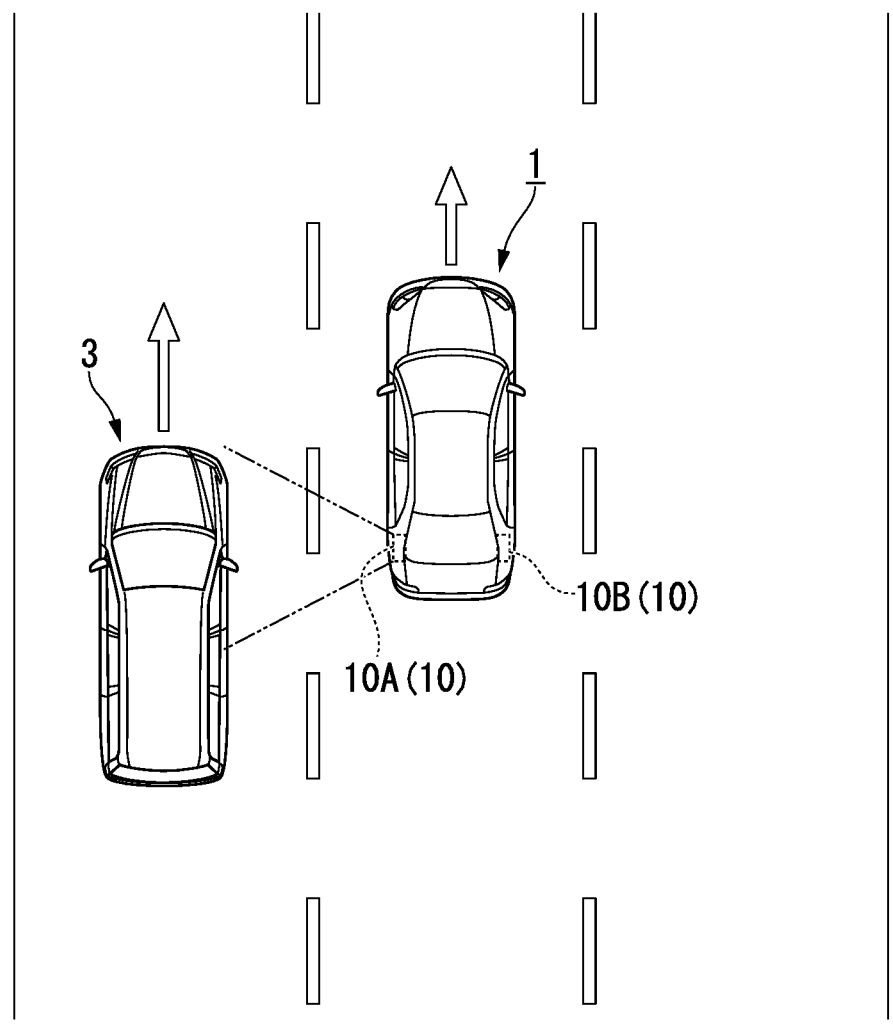
FIG. 1 is a schematic explanatory view of a vehicle including an object detection device according to an embodiment.

FIG. 1 is a schematic explanatory view of a vehicle including the object detection device according to the embodiment. In addition, in descriptions below, when directions such as forward, rearward, left, and right are particularly described, the directions are the same as directions of a vehicle 1 shown in FIG. 1.

As shown in FIG. 1, each of object detection devices 10 (10A and 10B) is provided on each of both right and left side portions in the rear of the vehicle 1. For example, the object detection device 10 is a device for detecting another vehicle 3 obliquely rearward with respect to the vehicle 1 during traveling of the vehicle 1. In addition, in descriptions below, the object detection device 10 provided on the left side portion in the rear of the vehicle 1 is described, and descriptions with respect to the object detection device 10B provided on the right side portion of the rear of the vehicle 1 are omitted.

Figure 2:
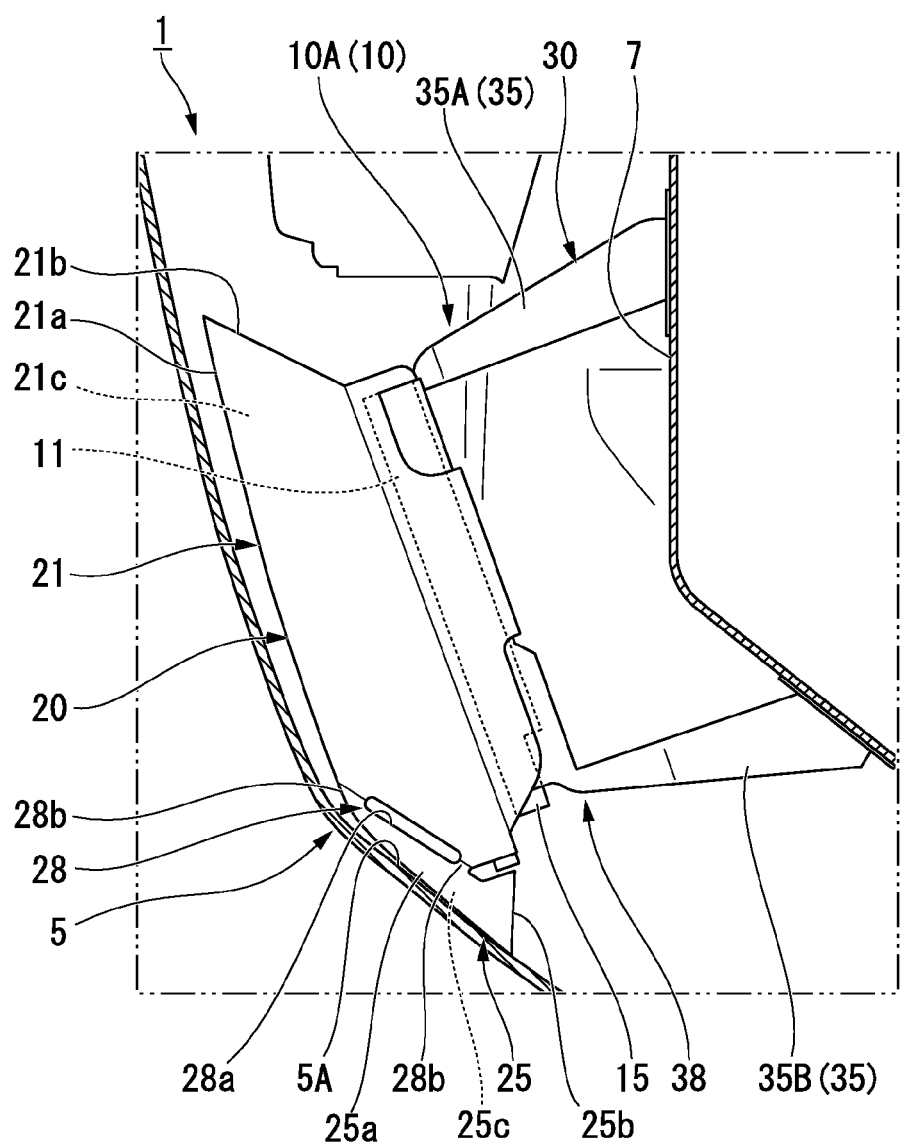
FIG. 2 is a top view of the vehicle including the object detection device according to the embodiment.

FIG. 2 is a top view of the vehicle including the object detection device according to the embodiment. In addition, FIG. 2 shows the object detection device when an outer body panel of the vehicle 1 is transparent.

As shown in FIG. 2, the object detection device 10A is disposed inside a rear bumper 5 of the vehicle 1, and is fixed to a floor body panel 7, for example.

Figure 3:
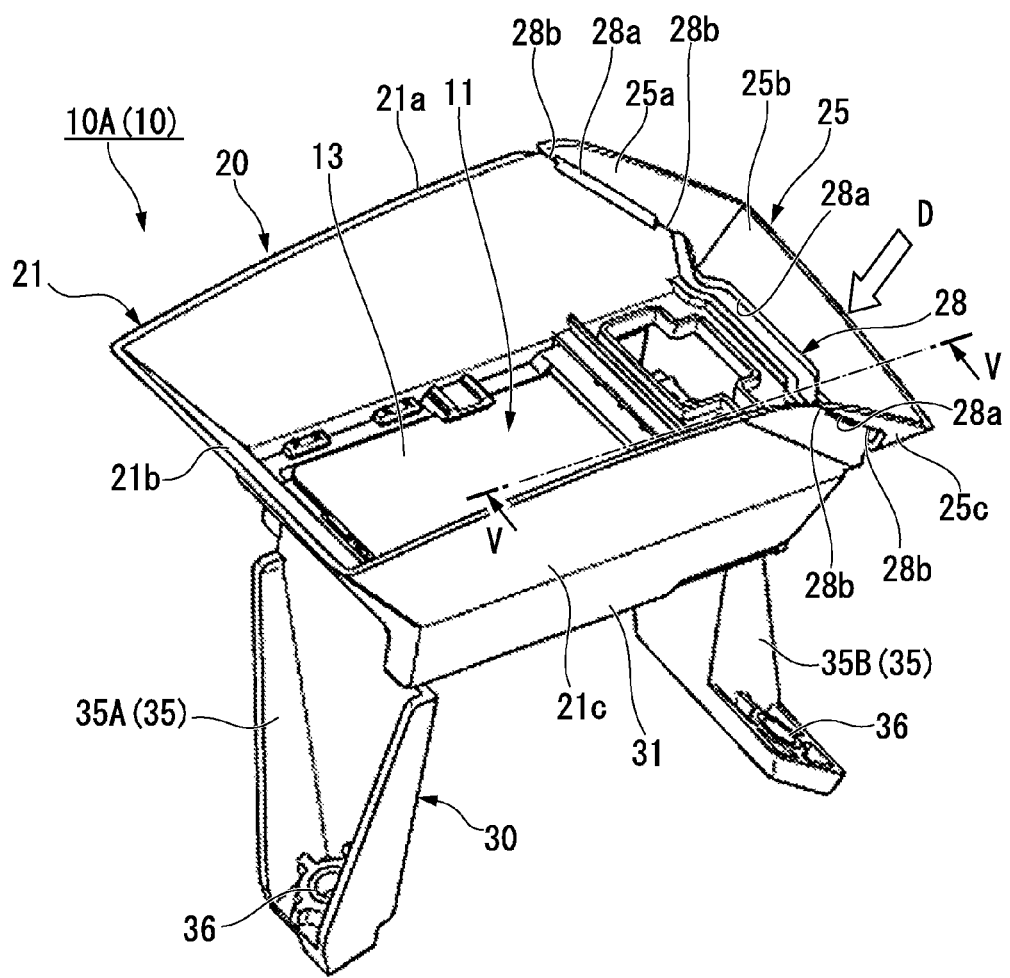
FIG. 3 is a perspective view of the object detection device according to the embodiment.
Figure 4:
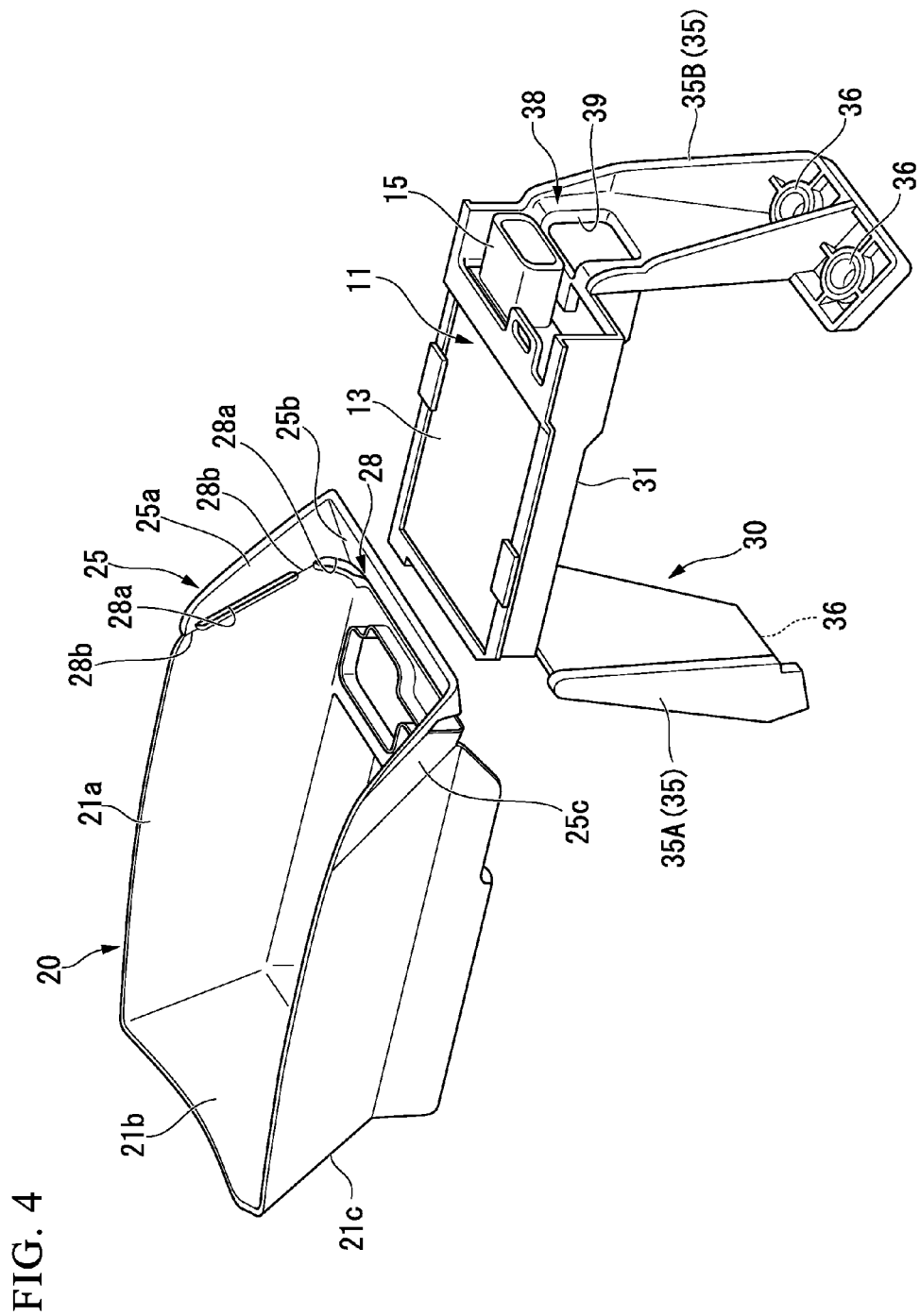
FIG. 4 is an exploded perspective view of the object detection device according to the embodiment.

FIG. 3 is a perspective view of the object detection device according to the embodiment, and FIG. 4 is an exploded perspective view of the object detection device according to the embodiment.

As shown in FIG. 3, the object detection device 10A includes a radar portion 11 (corresponding to an "object detection portion" of claims), a cover member 20, and a support member 30. Hereinafter, each component of the object detection device 10A will be described in detail.

The entire radar portion 11 is formed in a rectangular shape, and is a millimeter wave radar in which a detection range is set outward from the rear side inclined obliquely left of the vehicle 1 (refer to FIG. 1), or the like.

One main surface of the radar portion 11 faces the rear side inclined obliquely left of the vehicle 1, and becomes a radome 13 through which millimeter waves are transmitted. The radar portion 11 sends electromagnetic radar waves to the detection range, and receives reflected waves generated due to each transmission wave being reflected by an object (for example, another vehicle 3, and refer to FIG. 1) outside the vehicle 1. For example, based on the transmission waves and the reflected waves, the radar portion 11 outputs detection signals related to a distance from the radar portion 11 to the external object, a relative speed of the external object generated by Doppler effects, a relative speed of the external object with respect to the radar portion 11, a direction thereto, or the like.

As shown in FIG. 4, the radar portion 11 includes a connector portion 15 (corresponding to a "signal extraction portion" of claims). For example, the connector portion 15 is formed in a tubular shape, protrudes from the side surface of the radar portion 11, and includes a plurality of terminals (not shown). A connector of a wire harness (corresponding to a "signal wire" of claims) (not shown) is connected to the connector portion 15.

For example, the cover member 20 is formed of a resin material. The entire cover member 20 is formed in a tubular shape which opens in a direction orthogonal to the radome 13. For example, during rainfall or the like, the cover member 20 prevents detection accuracy of the radar portion 11 from being decreased due to attachment of water droplets or the like to the radar portion 11. As shown in FIG. 2, an edge portion of an opening of the cover member 20 is formed along an inner surface 5A of the rear bumper 5. The cover member 20 is attached to support member 30 supporting the radar portion 11, and extends from the radar portion 11 side toward the outside of the vehicle 1.

As shown in FIG. 3, the cover member 20 includes a cover main body portion 21 which is provided in a region positioned further forward than the connector portion 15, and a receiving portion 25 which is provided in a region positioned further rearward than the connector portion 15.

The cover main body portion 21 includes an upper wall portion 21a, a front wall portion 21b, and a lower wall portion 21c, and is formed in a U shape when viewed from the opening side of the cover member 20.

Figure 5:
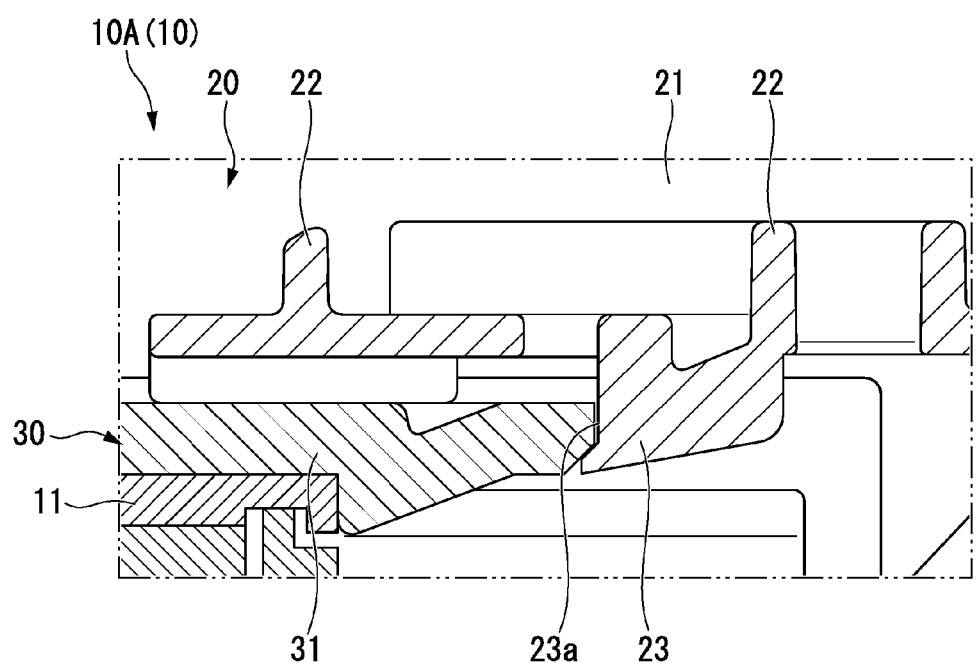
FIG. 5 is a sectional view taken along line V-V of FIG. 3.

FIG. 5 is a sectional view taken along line V-V of FIG. 3.

As shown in FIG. 5, a plurality of ribs 22 is provided on a bottom portion of the cover main body portion 21.

Each rib 22 stands up from the bottom portion of the cover main body portion 21 toward the opening. The ribs 22 reinforce the cover main body portion 21 and receive a load applied from the outside of the vehicle 1 as described below.

As shown in FIG. 2, the receiving portion 25 is positioned at a rear end of the cover member 20 when the object detection device 10A is attached to the vehicle 1. As shown in FIG. 3, the receiving portion 25 includes an upper wall portion 25a, a rear wall portion 25b, and a lower wall portion 25c, and is formed in a U shape when viewed from the rear side. As described below, the receiving portion 25 receives a load applied from the outside of the vehicle 1.

As shown in FIG. 3, the cover member 20 includes a first fragile portion 28. The first fragile portion 28 is provided between the cover main body portion 21 and the receiving portion 25. The first fragile portion 28 of the present embodiment is formed so as to include a slit 28a which is provided on a boundary portion between the cover main body portion 21 and the receiving portion 25, and a connection portion 28b which is provided to connect the upper wall portion 21a and the lower wall portion 21c of the cover main body portion 21, and the upper wall portion 25a and the lower wall portion 25c of the receiving portion 25. In addition, the shape of the first fragile portion 28 is not limited to the present embodiment, and for example, the first fragile portion 28 may be formed so that the boundary portion between the cover main body portion 21 and the receiving portion 25 is thinner than the thicknesses of the cover main body portion 21 and the receiving portion 25.

For example, the first fragile portion 28 is formed so as to be damaged when a load equal to or more than a first predetermined value and less than a second predetermined value is applied to the receiving portion 25 along a direction (refer to an arrow D in the drawings, and hereinafter, referred to as a load input direction D) orthogonal to the tip surface of the rear wall portion 25b. Here, for example, the first predetermined value is 500 N, and the second predetermined value is 1000 N. In addition, the damage includes rupture, destruction, bending, deformation, or the like.

As shown in FIG. 4, the support member 30 includes a support pedestal portion 31 and a pair of leg portions 35. The support pedestal portion 31 is formed in a rectangular frame shape in a plan view. For example, the radar portion 11 is inserted so as to be disposed inside the frame of the support pedestal portion 31 by snap fitting or the like.

Each of the pair of leg portions 35 stands up from the support pedestal portion 31 toward a side opposite to the cover member 20, and is connected to the vehicle 1 (refer to FIG. 2). In the present embodiment, each of the pair of leg portions 35 stands up so as to be orthogonal to the support pedestal portion 31 from the front end portion and the rear end portion of the support pedestal portion 31. Hereinafter, the leg portion 35 which stands up from the front end portion of the support pedestal portion 31 out of the pair of leg portions 35 and 35 is referred to a support leg portion 35A, and the leg portion 35 which stands up from the rear end portion of the support pedestal portion 31 is referred to as a receiving leg portion 35B.

A tubular collar member 36 is provided on each of the tip portions of the support leg portion 35A and the receiving leg portion 35B. For example, the collar member 36 is insert-molded with respect to each of the support leg portion 35A and the receiving leg portion 35B. The object detection device 10A is fixed to the vehicle 1 by inserting a fastening member such as a bolt (not shown) into the collar member 36 and fastening the collar member 36 to the floor body panel 7 (refer to FIG. 2).

A width of a base end portion of the support leg portion 35A is wider than a width of the support pedestal portion 31.

A second fragile portion 38 is provided on the base end portion of the receiving leg portion 35B. For example, the second fragile portion 38 is formed so that the width of the base end portion of the receiving leg portion 35B is narrower than the width of the base end portion of the support leg portion 35A. In addition, in the present embodiment, an opening portion 39 is formed on the base end portion of the receiving leg portion 35B at a position corresponding to the connector portion 15 of the radar portion 11. The opening portion 39 is formed in a rectangular shape in a front view, and is larger than the outline of the connector portion 15 of the radar portion 11.

Since the second fragile portion 38 and the opening portion 39 are provided, strength of the base end portion of the receiving leg portion 35B is lower than strength of the base end portion of the support leg portion 35A. The second fragile portion 38 is formed so as to be damaged when a load equal to or more than the second predetermined value is applied to the cover main body portion 21 in the load input direction D (refer to FIG. 3).

Here, as shown in FIG. 4, in the present embodiment, the support member 30 and the cover member 20 are formed so as to be members separated from each other and to be detachable from and attachable to each other. Specifically, an insertion portion which can be slidably inserted into the support pedestal portion 31 along a surface direction of the support pedestal portion 31 is formed on the bottom portion of the cover member 20. In addition, as shown in FIG. 5, an engagement claw 23 which can engage with a portion of the support pedestal portion 31 is provided on the bottom portion of the cover member 20. The engagement claw 23 includes an engagement surface 23a which crosses the support pedestal portion 31 in a sliding direction of the cover member 20. The engagement claw 23 engages with the support pedestal portion 31. Accordingly, it is possible to prevent the cover member 20 from slidably moving and being separated from the support pedestal portion 31.

(Operation)

Subsequently, an operation of the object detection device 10A formed as described above will be described.

FIGS. 6 to 9 are explanatory views of the operation of the object detection device, and are top views of the object detection device. In addition, in each of FIGS. 6 to 9, for easy understanding, the object detection device 10A and the rear bumper 5 are shown, and peripheral components are omitted. In addition, the rear bumper 5 is shown by a two-dot chain line.

Figure 6:
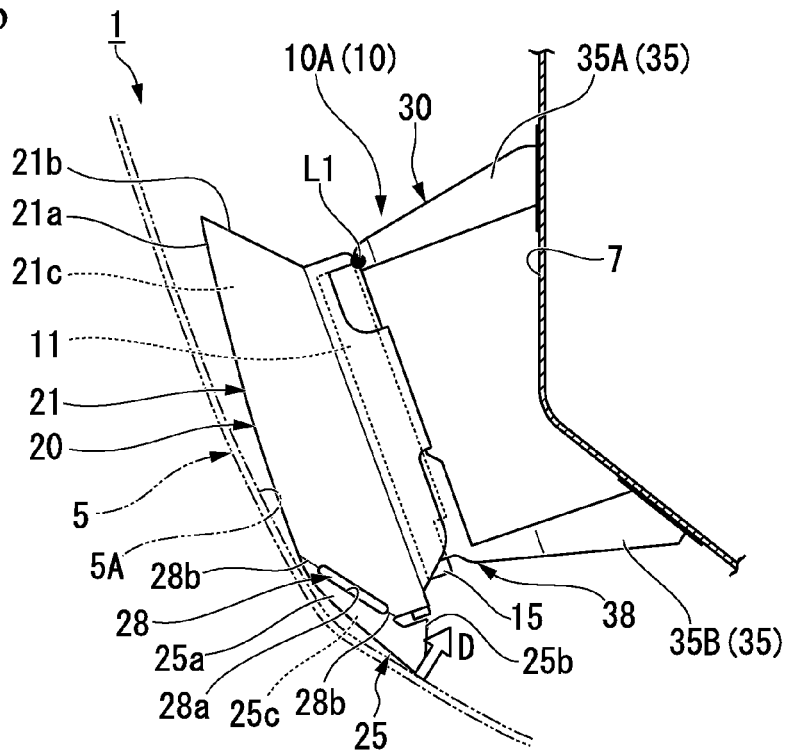
FIG. 6 is an explanatory view of an operation of the object detection device.

As shown in FIG. 6, for example, if impact is applied to the vehicle 1 from the rear side of the vehicle 1 toward the front side thereof due to a minor collision, the rear bumper 5 is displaced from the rear side toward the front side. In this case, a load equal to or more than the first predetermined value and less than the second predetermined value is applied to the tip surface of the rear wall portion 25b of the receiving portion 25 via the rear bumper 5 along the load input direction D.

Figure 7:
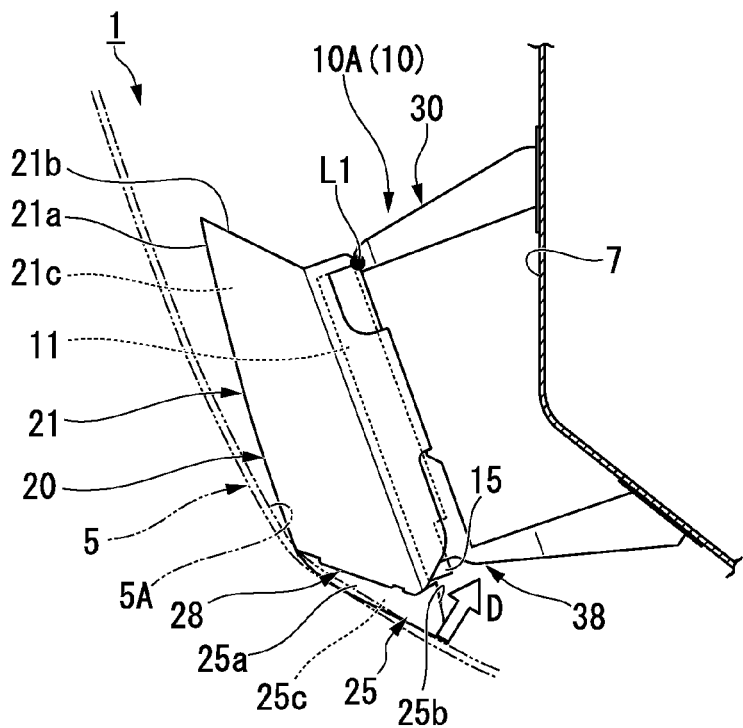
FIG. 7 is an explanatory view of an operation of the object detection device.

Subsequently, as shown in FIG. 7, for example, the connection portion 28b of the first fragile portion 28 is ruptured or bent according to the displacement of the rear bumper 5 and is damaged, and only the receiving portion 25 is displaced forward.

In this case, the load, which is applied to the rear wall portion 25b of the receiving portion 25 along the load input direction D and is equal to or more than the first predetermined value and less than the second predetermined value, is absorbed by the damage of the first fragile portion 28 and the displacement of the receiving portion 25, and it is possible to prevent the load from being transmitted to the support member 30 and the radar portion 11. Accordingly, the radar portion 11 is not damaged and is maintained at an original installation position.

In addition, for example, if a greater impact than the impact at the time of the minor collision is applied to the vehicle 1 from the rear side of the vehicle 1 toward the front side thereof, first, similar to at the time of the above-described minor collision, the load equal to or more than the first predetermined value and less than the second predetermined value is applied to the tip surface of the rear wall portion 25b of the receiving portion 25 via the rear bumper 5 along the load input direction D. Accordingly, the rear bumper 5 is displaced from the rear side toward the front side, and only the receiving portion 25 is displaced forward according to the displacement of the rear bumper 5 (refer to FIGS. 6 and 7).

Figure 8:
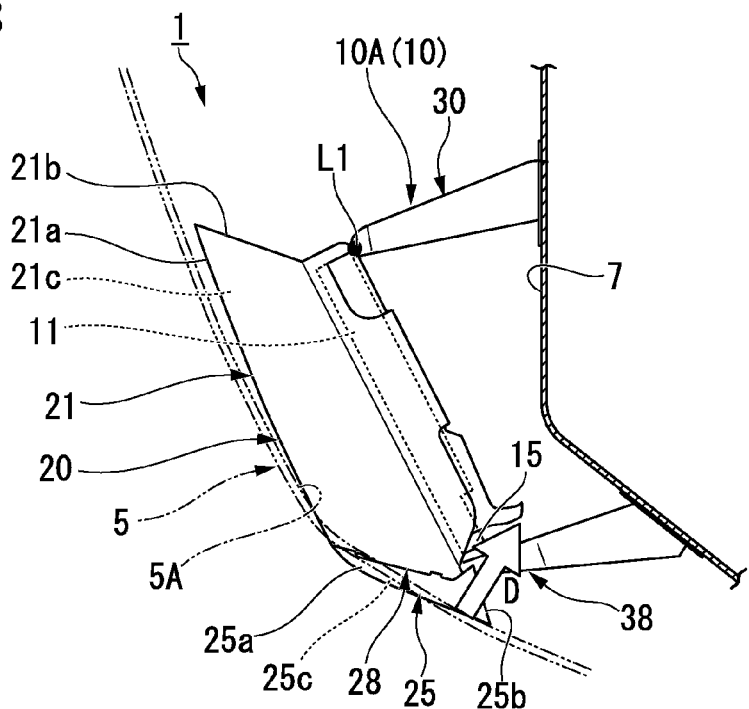
FIG. 8 is an explanatory view of an operation of the object detection device.

Subsequently, as shown in FIG. 8, if the rear bumper 5 is further displaced from the rear side toward the front side, the plurality of ribs 22 (refer to FIG. 5) provided on the bottom portion of the cover main body portion 21 comes into contact with the rear bumper 5. Accordingly, a load equal to or more than the second predetermined value is applied to the cover main body portion 21 of the cover member 20 along the load input direction D. In addition, as shown in FIG. 5, the engagement claw 23 which can engage with the support pedestal portion 31 is provided on the bottom portion of the cover member 20. In addition, the engagement claw 23 includes the engagement surface 23a which crosses the support pedestal portion 31 in a sliding direction of the cover member 20. Accordingly, as shown in FIG. 8, even when the load equal to or more than the second predetermined value is applied along the load input direction D, the slide movement of the cover member 20 is restricted, and it is possible to prevent the cover member 20 from being separated from the support pedestal portion 31.

Figure 9:
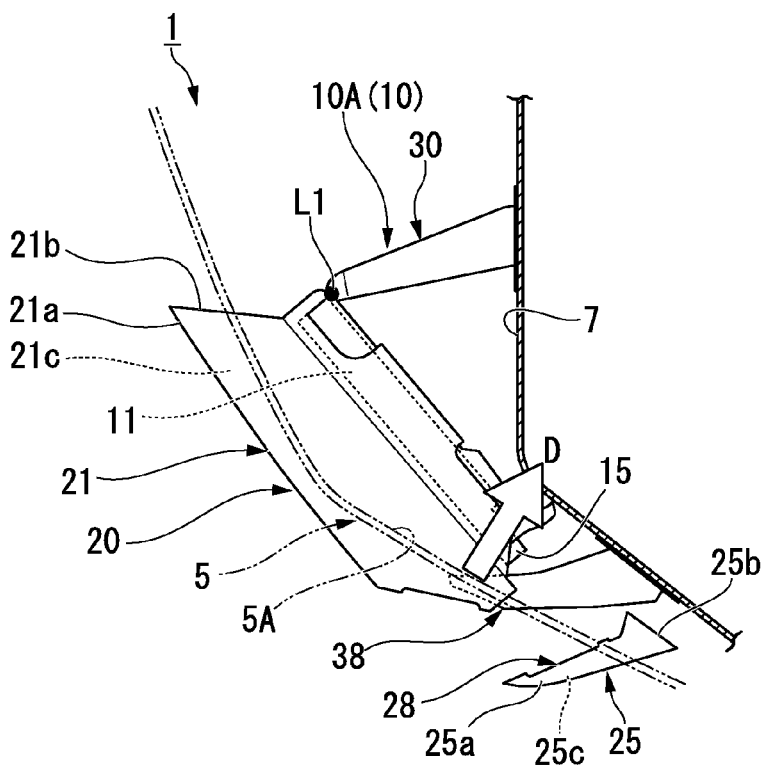
FIG. 9 is an explanatory view of an operation of the object detection device.

Subsequently, the load equal to or more than the second predetermined value is transmitted to the support leg portion 35A and the receiving leg portion 35B via the cover member 20 and the support member 30. Here, the second fragile portion 38, which is damaged when the load equal to or more than the second predetermined value is applied to the cover main body portion 21 in the load input direction D, is provided on the base end portion of the receiving leg portion 35B. Accordingly, as shown in FIG. 8, for example, the second fragile portion 38 is damaged due to rupture, bending, or the like. In addition, in this case, in the support member 30, a boundary between the support pedestal portion 31 and the support leg portion 35A is bent and deformed. Moreover, as shown in FIG. 9, the rear end portion of the support member 30 is rotated forward with a boundary line L1 between the support pedestal portion 31 and the support leg portion 35A as a rotation center according to the displacement of the rear bumper 5. Accordingly, the load, which is applied to the cover main body portion 21 along the load input direction D and is equal to or more than the second predetermined value, is absorbed by the damage of the second fragile portion 38 and the rotation of the support member 30, and it is possible to prevent the load from being transmitted to the radar portion 11. Accordingly, it is possible to prevent the radar portion 11 from being damaged.

Figure 10:
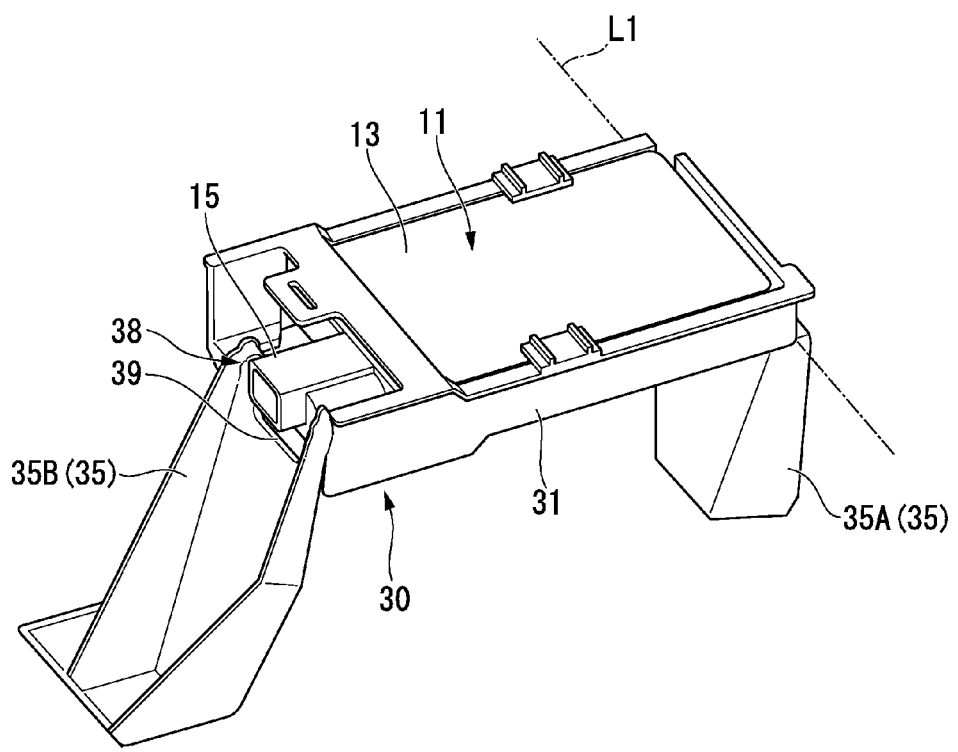
FIG. 10 is an explanatory view of an operation of the object detection device.

FIG. 10 is an explanatory view of an operation of the object detection device, and is a perspective view of the object detection device. In addition, in FIG. 10, for easy understanding, the cover member 20 (refer to FIG. 3) is not shown.

As shown in FIG. 10, in this case, if the rear end portion of the support member 30 is rotated, the connector portion 15 provided on the rear end portion of the radar portion 11 is rotated with the boundary line L1 as the rotation center according to the rotation of the rear end portion of the support member 30. In addition, the connector portion 15 of the radar portion 11 moves so as to enter the opening portion 39 provided in the receiving leg portion 35B. Accordingly, it is possible to prevent the connector portion 15 and the wire harness (not shown) connected to the connector portion 15 from being bit by the receiving leg portion 35B and the support pedestal portion 31. Accordingly, it is possible to prevent not only the radar portion 11 but also a peripheral component such as the wire harness from being damaged.

According to the present embodiment, since the first fragile portion 28 is formed so as to be damaged when the load equal to or more than the first predetermined value and less than the second predetermined value is applied to the receiving portion 25 along the load input direction D, the load is absorbed by the first fragile portion 28, and it is possible to prevent the load from being transmitted to the radar portion 11. Accordingly, when the load equal to or more than the first predetermined value and less than the second predetermined value is applied, it is possible to prevent the radar portion 11 from being deviated, and it is possible to prevent the peripheral component and the radar portion 11 from being damaged. In addition, since the second fragile portion 38 is formed so as to be damaged when the load equal to or more than the second predetermined value is applied to cover main body portion 21 along the load input direction D, the load is absorbed by the second fragile portion 38, and it is possible to prevent the load from being transmitted to the radar portion 11. Accordingly, when the load equal to or more than the second predetermined value is applied, it is possible to prevent radar portion 11 from being damaged.

In addition, the pair of leg portions 35 includes the receiving leg portion 35B provided at a position corresponding to the receiving portion 25 and the receiving leg portion 35B includes the second fragile portion 38, when the load equal to or more than the second predetermined value is applied to the cover main body portion 21 along the load input direction D, the second fragile portion 38 of the receiving leg portion 35B is damaged, and the support leg portion 35A other than the receiving leg portion 35B and the support pedestal portion 31 to which the radar portion 11 is attached are connected to each other. Accordingly, the load is absorbed by the second fragile portion 38, it is possible to prevent the load from being transmitted to the radar portion 11, and it is possible to prevent the radar portion 11 from greatly moving. Particularly, in the present embodiment in which two leg portions 35 are provided and one thereof is the receiving leg portion 35B, it is possible to move the support pedestal portion 31 so as to be rotated with the boundary line L1 between the support leg portion 35A other than the receiving leg portion 35B and the support pedestal portion 31 as the rotation center. Accordingly, the load is absorbed so as to prevent the radar portion 11 from greatly moving, and it is possible to prevent the radar portion 11 from being damaged.

In addition, since the opening portion 39 is formed at the position corresponding to the connector portion 15 in the second fragile portion 38, when the load equal to or more than the second predetermined value is applied to the cover main body portion 21 and the second fragile portion 38 is damaged, the connector portion 15 can enter the opening portion 39. Accordingly, since it is possible to prevent the connector portion 15 and the wire harness from being bit by the receiving leg portion 35B and the support pedestal portion 31, it is possible to prevent the radar portion 11 and the wire harness from being damaged.

In addition, the present invention is not limited to the embodiment which is described with reference to the drawings, and various modifications may be adopted within the technical range.

In the embodiment, the case where the object detection device 10A is provided on the left side portion in the rear of the vehicle 1 is described. However, the position of the object detection device 10 is not limited to the embodiment.

In addition, in the embodiment, the receiving portion 25 is provided on the rear end portion of the cover member 20. However, the position of the receiving portion 25 is not limited to the embodiment.

In the embodiment, the case where the object detection device 10A includes the pair of leg portions 35 is described. However, the number of the leg portions 35 is not limited to the embodiment. Moreover, in the embodiment, the case where one receiving leg portion 35B in which the second fragile portion 38 is formed is provided is described. However, the number of the receiving leg portions 35B in which the second fragile portion 38 is formed is not limited to the embodiment.

Moreover, in the embodiment, the case is described in which the boundary between the support pedestal portion 31 and the support leg portion 35A is bent and deformed when the load equal to or more than the first predetermined value and less than the second predetermined value is applied. However, the boundary between the support pedestal portion 31 and the support leg portion 35A may be ruptured.

Moreover, in the embodiment, the plurality of ribs 22 is provided on the bottom portion of the cover member 20. However, the number, the shape, or the like of the ribs 22 is not limited. In addition, the ribs 22 may not be provided on the bottom portion of the cover member 20.

In the embodiment, the connector portion 15 (so-called direct connector) protruding from the radar portion 11 is described as the example of the signal extraction portion. However, for example, a configuration in which the wire harness is directly extracted from the radar portion 11 may be adopted as the signal extraction portion.

In the embodiment, as the example of the radar portion 11 which is the object detection portion, the millimeter wave radar is described. However, the radar portion 11 is not limited to the millimeter wave radar. Moreover, another vehicle 3 is described as the example of the object which is detected by the radar portion 11. However, the object which is detected by the radar portion 11 is not limited to another vehicle 3.

In addition, in the embodiment, the cover member 20 is configured so as to be provided on the support member 30. However, the cover member 20 may be configured so as to be provided on the radar portion 11.

Moreover, in the embodiment, the cover member 20 and the support member 30 are formed so as to be members separated from each other and to be detachable from and attachable to each other. However, the cover member 20 and the support member 30 may be integrally formed with each other, and the cover member 20 and the radar portion 11 may be integrally formed with each other.

Moreover, the components in the above-described embodiment may be appropriately replaced by well-known components within a range which does not depart from the gist of the present invention.

What is claimed is:

1. An object detection device, comprising:
an object detection portion which detects an object around a vehicle;
a support member by which the object detection portion is attached to the vehicle; and
a cover member which is provided in at least one of the object detection portion and the support member and extends from the object detection portion side toward the outside of the vehicle,
wherein the cover member includes
a cover main body portion,
a receiving portion which receives a load applied from the outside of the vehicle, and
a first fragile portion which is provided between the cover main body portion and the receiving portion,
wherein the support member includes a second fragile portion,
wherein the first fragile portion of the cover member is formed to be damaged when a load equal to and more than a first predetermined value and less than a second predetermined value is applied to the receiving portion along a predetermined direction, and
wherein the second fragile portion of the support member is formed to be damaged when a load equal to and more than the second predetermined value is applied to the cover main body portion along the predetermined direction.

2. The object detection device according to claim 1, wherein the support member includes,
a support pedestal portion to which the object detection portion is attached, and a plurality of leg portions which stand up from the support pedestal portion and are connected to the vehicle, wherein the plurality of leg portions includes a receiving leg portion which is provided at a position corresponding to the receiving portion, and wherein the receiving leg portion includes the second fragile portion.

3. The object detection device according to claim 2, wherein the object detection portion includes a signal extraction portion to which a signal wire is capable of being connected at a position corresponding to the receiving leg portion, and wherein an opening portion is formed at a position corresponding to the signal extraction portion in the second fragile portion.

* * * * *